United States Patent Office 2,870,131
Patented Jan. 20, 1959

2,870,131

HIGH DENSITY POLYETHYLENE BY HIGH PRESSURE POLYMERIZATION WITH HYDROGEN AND AZO CATALYST

James E. Guillet and Harry W. Coover, Jr., Kingsport, Tenn., assignors to Eastman Kodak Company, Rochester, N. Y., a corporation of New Jersey No Drawing. Application June 12, 1956
Serial No. 590,811

5 Claims. (Cl. 260—94.9)

This invention relates to the manufacture of polyethylene and is particularly concerned with a high pressure polymerization process as described hereinafter whereby polyethylene having high density, high stiffness and high heat distortion temperatures not attained heretofore in high pressure processes is readily produced.

The commercial polyethylene produced and sold in increasing quantities in recent years has all been made by the so-called high pressure process using pressures in excess of 200 atmospheres and usually of the order of 500–1500 atmospheres as described by Fawcett et al. in U. S. 2,153,533. Various modifications have been introduced but the basic process has still been that of Fawcett et al. whereby solid polyethylene is produced having a density of 0.91–0.92, a tensile strength at yield of 1100–1600 p. s. i., an elongation of 300–600 percent, a stiffness of 10,000–15,000 p. s. i., an average molecular weight of 15,000–40,000 and a heat distortion temperature of 100–110° C. Such a material has found widespread use in the manufacture of flexible films for packaging etc. and in flexible molded articles.

More recently, certain low pressure catalytic processes have been found which will give polyethylene of higher density and greater stiffness and strength which made the fabrication of rigid articles from polyethylene a possibility. Furthermore such high density polyethylene exhibited an increase in its heat distortion temperature whereby it was not adversely affected by boiling water. Such improved polyethylene, however, necessitates the use of different equipment, conditions, etc. and it has been an unfulfilled objective heretofore to achieve such improved properties using essentially the high pressure process which has already been developed into a large scale commercial manufacture.

It is accordingly an object of this invention to provide an improved high pressure process whereby polyethylene can be readily obtained having greatly improved density, stiffness, tensile and heat distortion temperature characteristics.

Another object of the invention is to provide a modified process whereby greatly improved polyethylene can be obtained using the apparatus and techniques already in commercial practice for large scale production of lower density polyethylene.

Another object of the invention is to provide a combination of reactants, reaction conditions and reaction influencing substances which give results in a high pressure process quite different than those achieved heretofore in high pressure ethylene polymerization.

Other objects will be apparent from the description and claims which follow.

These and other objects are attained by means of this invention wherein ethylene homopolymers having an average molecular weight above 20,000, a density above 0.930, a stiffness of at least 25,000 p. s. i. and a heat distortion temperature in the range of 110–130° C. are manufactured by polymerizing ethylene at a pressure of at least 10,000 p. s. i. and a temperature of 80–180° C. in the presence of an azo catalyst for ethylene polymerization and from 0.01 to 5% by weight of hydrogen based on the ethylene.

Thus, in accordance with the invention a new polyethylene is obtained which differs markedly from the usual high pressure polyethylene of commerce as shown by the comparative data on typical examples in Table 1.

TABLE 1

|  | Conventional polyethylene | New polyethylene |
|---|---|---|
| Average density | 0.91–0.92 | 0.93–0.955 |
| Average mol. weight | 15,000–40,000 | 20,000–200,000 |
| Stiffness (p. s. i.) | 10,000–15,000 | 25,000–60,000 |
| Heat distortion temp. ° C. | 100–110 | 110–130 |
| Tensile strength (at yield, p. s. i.) | 1,100–1,600 | 2,000–3,000 |

This result is even more surprising when it is considered that Hanford showed in U. S. 2,387,755 that under different high pressure conditions, hydrogen gave "semi-soft, paste-like polymeric product" which has softening temperatures of the order of 79° C.

Thus, by means of this invention, we have been able to produce by a slight modification of commercial high pressure processes, a polyethylene which is quite different than the usual low-density flexible polymer ordinarily produced by such processes. The improved process embodying the invention is carried out at pressures of at least 10,000 p. s. i. with pressures of 10,000–50,000 p. s. i. being wholly operable and pressures of 15,000–30,000 p. s. i. and desirably about at least 20,000 p. s. i. being preferred. The process embodying the invention can be carried out at temperatures within the range of 80–180° C. although somewhat lower or higher temperatures can be used sometimes by varying the pressure and catalyst concentration conditions.

In practicing the invention, the improved results are achieved by effecting the polymerization in the presence of any of the well-known azo catalysts for ethylene polymerization and from 0.01 to 5% by weight based on the ethylene of hydrogen, the preferred range of hydrogen concentration being from 0.01% to 1% by weight. The polymerization can be carried out in the presence or absence of a solvent such as benzene which is known to improve the properties of polyethylene. The amount of azo catalyst can be varied from 5 parts per million to 5% by weight based on the ethylene with the preferred range being in the range of 10–1000 parts per million parts of ethylene. Azo catalysts for ethylene polymerization are well known in the art, a large number of such catalysts being shown in U. S. 2,471,959; 2,515,628; 2,520,338; 2,520,339 and 2,565,573. Any of these or similar azo catalysts can be employed in practicing this invention since the invention resides in the combination of any of the azo catalysts with the hydrogen under the conditions herein disclosed to give the results herein defined rather than in the nature of the particular azo catalyst employed. To illustrate, such diverse azo catalysts as azobis isobutyronitrile, methyl azobisisobutyrate and diethyl 2,2'-azobis(2-methyl propionate) are equally useful in achieving the improved results embodying the invention.

The process embodying the invention can be effected in any of the conventional equipment for high pressure ethylene polymerization by single stage or multi-stage processes and by either gaseous or liquid dispersion polymerization in benzene or the like, with autoclave or elongated tubular reactors in accordance with usual practices. The pressures attained are achieved as usual by pressuring the reactor to the desired degree with ethylene (together with hydrogen which can be introduced in admixture with the ethylene or separately). The usual polymer recovery processes are also applicable. The invention is illustrated by the following examples which are not intended to limit the scope of the invention unless otherwise specifically indicated. In order to illustrate the best methods known heretofore for increasing the characteristic properties of high pressure polyethylene and to furnish a further contrast to the improved results attained by means of this invention, Examples 1-3 have been included illustrating the use of benzene in conventional high pressure processing.

*Example 1*

A solution of 0.008 part by weight of 2,2'-azobis-(2-methyl propionate) in 20 parts by volume of benzene was charged into a stainless steel autoclave of 100 volumes capacity which had been purged for 3 minutes with a stream of ethylene. The reactor was then closed and pressured to 20,000 p. s. i. with ethylene and the polymerization effected at 100° C. for 2 hours. The reactor was then cooled rapidly to room temperature and vented. The polyethylene thereby obtained had an inherent viscosity of 2.08 deciliters per gram in tetralin at 100° C., a density of 0.929 and a stiffness of 20,000 p. s. i.

*Example 2*

The process described in Example 1 was repeated using 0.004 part by weight of di-tert.-butyl peroxide in the benzene as catalyst and a polymerization temperature of 140° C. The resulting polyethylene had an inherent viscosity of 3.13, a density of 0.921 and a stiffness of 19,000 p. s. i.

*Example 3*

The process of Example 2 was repeated using 0.001 part by weight of di-tert.-butyl peroxide in 20 parts by volume of benzene with a polymerization pressure of 20,000 p. s. i. and a temperature of 180° C. The resulting polyethylene had an inherent viscosity of 2.4, a melt index of 0.0, a density of 0.923 and a stiffness of 20,000. Thus it is apparent that the modifications known to the art were not effective to raise the density to 0.930 or the stiffness above 20,000 p. s. i. The unexpected improvement achieved by means of this invention is illustrated by the following examples.

*Example 4*

To the autoclave which had been purged with ethylene was charged 0.008 part by weight of diethyl 2,2'-azobis-(2-methyl propionate) without any added solvent or diluent. The autoclave was then pressured with 200 p. s. i. of hydrogen gas and 20,000 p. s. i. of ethylene gas, and the polymerization effected at 100° C. Solid polyethylene in a yield of 12.8 parts by weight was obtained, and this polymer had an inherent viscosity of 1.14 and a density of 0.937. The stiffness of a molded bar was 45,000 p. s. i., and the tensile strength at yield was 2950 p. s. i. This polyethylene thus had a greatly increased crystallinity and density and readily molded into articles having greatly increased stiffness, surface hardness and mold finish. Similar results were obtained using the other well-known azo catalysts such as azobisisobutyronitrile and methyl azobisisobutyrate.

*Example 5*

The preceding example illustrates the greatly improved results obtained without a solvent or diluent. If desired, the polymerization can also be effected in benzene or other suitable solvent. Thus 0.008 part by weight of diethyl 2,2'-azobis-(2-methyl propionate) dissolved in 20 parts by volume of benzene was used to polymerize ethylene at 100° C. and 20,000 p. s. i. in the presence of 1000 p. s. i. of hydrogen gas. The resulting polyethylene, obtained in a yield of 8.7 parts by weight after 2 hours, had a density of 0.953 and an inherent viscosity of 0.95. Unlike previously known polyethylene which had been modified with hydrogen whereby the softening or heat distortion temperature dropped from 100–110° C. to about 80° C., the homopolymers embodying this invention had heat distortion temperatures in the range of 110–130° C. using any of the well-known azo catalysts for ethylene polymerization.

Thus, the products obtained by means of this invention exhibited greatly improved density (and correspondingly increased crystallinity), much higher heat distortion temperatures than conventional high pressure polyethylene, and much greater rigidity and tensile strength than obtainable heretofore by high pressure polymerization. The process of the invention is readily effected in equipment already available, and the known techniques for commercial manufacture are applicable. The greatly changed characteristics of the polyethylene obtained under this invention markedly widens the field of use of high pressure polyethylene.

Although the invention has been described in detail with reference to certain preferred embodiments thereof, it will be understood that variations and modifications can be effected within the spirit and scope of the invention as described hereinabove and as defined in the appended claims.

We claim:

1. The method of polymerizing ethylene to form an improved solid ethylene homopolymer having an average molecular weight of at least 20,000, a density above 0.930 and a stiffness of at least 25,000 p. s. i. which comprises polymerizing ethylene at a temperature of 80–180° C. and a pressure of 10,000–50,000 p. s. i. in the presence of an azo catalyst for ethylene polymerization and from 0.01 to 5% by weight of hydrogen based on said ethylene.

2. The method according to claim 1 wherein the pressure is 15,000–30,000 p. s. i.

3. The method according to claim 1 wherein the concentration of azo catalyst is in the range of from 5 parts per million to 5% by weight based on the ethylene.

4. The method according to claim 1 wherein the azo catalyst is diethyl 2,2'-azobis (2-methyl propionate).

5. The method according to claim 1 wherein the polymerization is effected in benzene.

References Cited in the file of this patent

UNITED STATES PATENTS

| | | |
|---|---|---|
| 2,387,755 | Hanford | Oct. 30, 1945 |
| 2,710,854 | Seelig | June 14, 1955 |
| 2,773,053 | Field | Dec. 4, 1956 |

FOREIGN PATENTS

| | | |
|---|---|---|
| 502,597 | Canada | May 18, 1954 |